United States Patent
Raad

[19]

[11] Patent Number: 5,998,894
[45] Date of Patent: Dec. 7, 1999

[54] MODULAR BEARING FAILURE SENSOR FOR AN ELECTRICAL GENERATOR

[75] Inventor: Bernard A. Raad, Oxnard, Calif.

[73] Assignee: Pacific Scientific, Carpinteria, Calif.

[21] Appl. No.: 09/220,534

[22] Filed: Dec. 24, 1998

Related U.S. Application Data

[60] Provisional application No. 60/095,352, Aug. 4, 1998.

[51] Int. Cl.⁶ .................................................. H02K 11/00
[52] U.S. Cl. .......................... 310/68 B; 310/90; 310/89; 384/448; 340/682; 324/154; 324/123; 324/173; 73/593; 73/587
[58] Field of Search ........................... 310/68 R, 90, 310/89; 384/448, 625, 220, 221; 340/682; 324/220, 230, 245, 246, 545, 123, 173; 73/593, 587

[56] References Cited

U.S. PATENT DOCUMENTS

| | | |
|---|---|---|
| 3,108,264 | 10/1963 | Heinoo ..................................... 340/269 |
| 3,508,241 | 4/1970 | Potter ..................................... 340/269 |
| 4,015,882 | 4/1977 | Stenert ..................................... 308/1 |
| 4,275,376 | 6/1981 | Alexander et al. ..................... 340/52 |
| 5,010,290 | 4/1991 | Foster ..................................... 324/173 |
| 5,385,411 | 1/1995 | Shirai et al. ........................... 384/446 |
| 5,508,608 | 4/1996 | Goossens ............................... 324/174 |
| 5,550,467 | 8/1996 | Goossens ............................... 324/173 |
| 5,602,437 | 2/1997 | Shahamat et al. ..................... 310/90 |
| 5,677,488 | 10/1997 | Monahan et al. ...................... 73/593 |
| 5,701,119 | 12/1997 | Jurras, III ............................. 340/682 |
| 5,796,349 | 8/1998 | Klein ..................................... 340/682 |

*Primary Examiner*—Nestor Ramirez
*Assistant Examiner*—Thanh Lam
*Attorney, Agent, or Firm*—Ralph D. Chabot

[57] ABSTRACT

A ring-shaped bearing failure sensor constructed of insulation and electrically conductive material utilizing printed circuit board technology. Because of its construction, high dimensional tolerances can be achieved and the ring can be easily assembled as a component of a generator. Further, the bearing sensor is equipped with a resistor so that the operational readiness of the sensor can be monitored.

13 Claims, 4 Drawing Sheets

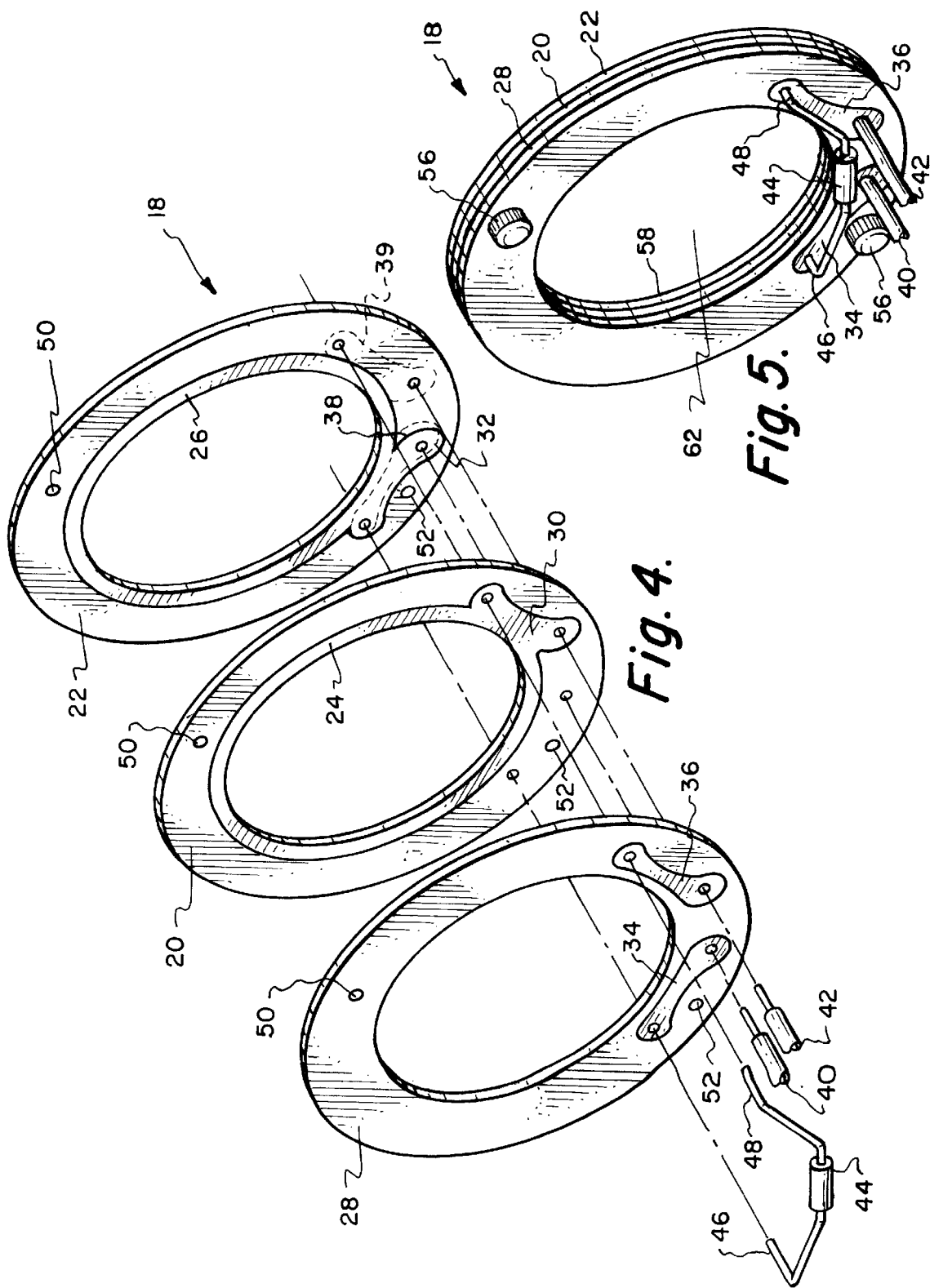

MODULAR BEARING FAILURE SENSOR FOR AN ELECTRICAL GENERATOR

This application is a continuation-in-part of provisional application bearing Ser. No. 60/095,352 filed Aug. 4, 1998.

TECHNICAL FIELD

This invention relates to electrical generators, and more specifically to a generator that includes a modular bearing failure sensor which, when integrated as part of a warning system, can detect when bearing wear has exceeded a particular threshold.

BACKGROUND ART

Rotating machines, such as generators and motors, feature bearing assemblies (usually two) that support a shaft. The bearing assemblies maintain concentricity between a rotor assembly mounted on the shaft and a stator or housing assembly.

In electrical generators, such as those used to power the electrical systems of aircraft, the generator is connected to the main engine by a drive shaft. The rotor assembly and shaft rotate within the stator assembly. The shaft of most air cooled generators is supported for rotation in the housing using sealed bearing assemblies comprising grease lubricated ball bearings. In the course of normal generator operation, the bearings are subject to wear. Worn bearings, if not replaced, can eventually lead to bearing failure which will cause rotor rub and, because of the generator's kinetic energy, consequent severe damage. Hence, most rotating machines employed in sensitive applications follow a strict bearing replacement schedule with intervals short enough to fall outside the distribution curve of bearing wear-out failures.

In the aircraft industry, periodic scheduled maintenance is conducted based upon the operating time of the equipment. This is commonly referred to as "time-between-overhaul" (TBO). As part of a TBO maintenance program, a generator's bearings are replaced at predetermined service intervals.

The bearing replacement intervals are determined based upon worst-case scenarios of bearing wear, and the bearings are scheduled for replacement before any reasonable possibility of bearing failure can occur. As a result, the bearings are usually replaced long before they are actually worn out, and in many situations, the generators are disassembled and serviced unnecessarily before there is any immediate need for bearing replacement. This results in unnecessary servicing, and lost revenue associated with the equipment downtime.

Prior art has incorporated an auxiliary bearing system to keep the rotor supported in the event of a main bearing failure. This system features a smaller auxiliary bearing assembly mounted in close proximity, near each main bearing assembly. Under normal conditions, the main bearing assemblies support the shaft, while the auxiliary bearing assemblies idle or, in other words, spin freely along with the rotating shaft. This condition is made possible by an annular clearance such as, for example, 0.002 inch between the outer race of the auxiliary bearing and the generator housing; sometimes referred to as the bearing support wall.

In the absence of friction, no relative motion can exist between inner and outer races of the auxiliary bearing and no wear is incurred. In this manner, the auxiliary bearing assemblies remain ready to take over support of the shaft from the main bearing assembly, as soon as the main bearings fail or wear sufficiently for the internal clearance, here defined as the distance between the inner and outer races, to equal or exceed the annular clearance between the auxiliary bearing outer race and the bearing support wall.

Therefore, as a main bearing assembly begins to wear, the distance between its inner and outer race decreases. Since the main bearing outer race is frictionally engaging the bearing support wall, the shaft will slowly move closer to the bearing support wall as the main bearing wears. The annular clearance between the bearing support wall and the outer race of the auxiliary bearing will decrease as the main bearing wears until eventually the outer race of the auxiliary bearing will frictionally engage the bearing support wall. It is at this point where the auxiliary bearing begins to support the shaft.

In the prior art, the bearing support wall is metallic. However, because of the heavy weight or density of steel, the bearing support wall is usually constructed of aluminum with a thin layer of steel, commonly termed a steel liner on the surface which faces the generator shaft.

Completing the prior art system is a bearing failure sensor. This device announces the failure of the main bearing and is essential to achieve "on-condition" operation. It functions by alerting the operator or pilot that a main bearing assembly has failed and that the auxiliary bearing assembly has assumed support of the generator shaft. A typical prior art sensor is illustrated in FIG. 7 and has a grooved channel 90 into which is inserted a wire 92 partially covered with insulation 94. This prior art, in theory, provides adequate operation time to land the aircraft and replace the main bearings before the auxiliary bearings fail.

Prior art has dealt with bearing failure sensors in a variety of ways, though most have been labor intensive and difficult to implement.

U.S. Pat. No. 5,602,437 issued to Shahamat et al. attempted to address the concerns regarding unnecessary servicing. Shahamat discloses a bearing failure detector in the form of a disc positioned about the generator shaft. The disc itself includes an electrically conductive ring encased in an insulation layer but having the conductive ring exposed along the inside edge of the disc which faces the shaft. Initially, there is a set clearance between the shaft and the conductive ring. The ring is connected to a large resistance which is monitored by a control circuit.

Shahamat et al. teaches that as the bearings wear, the generator shaft will eventually contact the conductive ring, establishing a circuit where the electrical resistance monitored by the control circuit will approach zero and thereafter send an appropriate warning signal to the cockpit.

In Shahamat et al., the conductive ring surface which faces the shaft is bare. This configuration could provide false indications if airborne contaminants or moisture are present. Further, Shahamat et al. relies on the conductive ring contacting the generator shaft to indicate impending failure. This warning indication would only be for a limited time because the possibility exists that the rotating shaft wears through the conductive ring if the diameter of the ring is small.

Even though TBO results in unnecessary servicing of aircraft generators, TBO procedures are necessary because there has been no reliable means by which one could determine whether or not a generator's bearings were close to actual failure.

DISCLOSURE OF INVENTION

The present invention is directed to a generator which comprises an improved bearing failure sensor which is manufactured to strict dimensional tolerances and is modular in design. Its primary purpose is to eliminate the need for TBO maintenance and replace with an "on-condition" operation program.

"On-condition" operation is defined as a generator unit being operated without any scheduled maintenance or overhauls. "On-condition" operation will permit bearing life to be maximized and the generator overhauled only when a repair is absolutely necessary.

My invention offers ease of use by emphasizing modularity, and reduces cost and labor by employing printed circuit board technology.

Tight dimensional tolerances and an efficient manufacturing process can be achieved using printed circuit board technology. The ability to size the bearing sensor with precision is critical to its practical application as will be discussed in detail below.

Ideally, my invention will be used in aircraft generators where an auxiliary bearing system constructed of electrically conductive material is also utilized as a back-up to the main bearing system. However, in less critical applications, my invention may also be used without an auxiliary bearing back-up assembly and instead, contact the generator shaft.

My bearing sensor is a laminated printed circuit board. Preferably, the sensor is shaped in a ring or disc configuration. The sensor disc has both a close tolerance outer diameter (OD) and a close tolerance inner diameter (ID). The generator will have a recess formed in the housing for receiving the bearing sensor. This recess is also sized with precision so that when the sensor disc is inserted into the recess, there is little free space for the sensor to move within the recess. Once positioned, the sensor is thereafter held in place by a screw or other type of holding means for securing the sensor disc within the recess.

In the preferred embodiment, the recess base is not entirely flat. A depression exists so that when the sensor is seated in the recess, the enlarged conductive areas on the bottom of the sensor, will not contact the metallic housing.

Although the preferred configuration of the sensor is ring-shaped, the outer shape or circumference can be of any simple geometric design such as circular, square, rectangle, etc. The important aspect of the outer shape is that it properly fit within the housing recess so that free space between the sensor and the recess walls is minimized.

The close tolerance ID of the bearing sensor also defines a close tolerance inner circumference which, when the sensor is seated and secured within the housing recess, its inner circumference will be about and equidistant from the auxiliary bearing assembly mounted on the shaft.

Because the sensor is positioned about the generator shaft, it will sense imminent bearing failure at any point around the shaft. This feature is of particular advantage over the prior art where generators are used on aircraft which utilize vertical take-off and horizontal flight generator orientation. Accordingly, one advantage of the sensor is that it will provide an all-attitude bearing failure detection capability.

Critical positioning of the sensor disc OD relative to the bearing support recess also properly positions the bearing sensor about the generator shaft. However, in the preferred embodiment, rather than being positioned for direct contact with the generator shaft, the bearing support recess is positioned so that the inside circumference of the bearing sensor disc will be adjacent to and facing the outer race of the auxiliary bearing assembly attached to the shaft. Typically, an auxiliary bearing assembly is provided for each main bearing assembly and therefore, a bearing support recess and bearing sensor disc will be provided for each auxiliary bearing assembly.

As stated above, before any wear occurs to the main bearing, there is an annular clearance between the bearing support wall of the housing and the outer race of the auxiliary bearing assembly. For purposes of illustration, assume an annular clearance of 0.060 inch. This means that the main bearing assembly must wear 0.060 inch before the auxiliary bearing will assume support for the generator shaft.

The inside diameter of the sensor must be slightly less than the inside diameter of the bearing support wall of the housing so that it will protrude a given distance into the annular clearance. Then, as the main bearing wears, the outer race of the auxiliary bearing will contact the conductive layers of the sensor at a predetermined distance from the bearing support wall, establishing a circuit to a control unit which will notify the cockpit that the main bearing is close to failure.

The above has described how the sensor is positioned relative to the shaft and bearing support recess. The following will describe the composition of the sensor.

The sensor is a lamination of different layers. Preferably, the sensor comprises a pair of layers which each have an electrically conductive ring made from copper or other conductive material on one side of each layer. Each layer includes an insulation material made of GIL, a high temperature, high strength laminating plastic; ceramic; or other material suitable for the application. The lamination is configured so that each conductive ring is separated from the other by the insulation material. The lamination technique is well known to those having skill in printed circuit board technology and will not be discussed.

Disposed across the lamination edge of the inner circumference of the sensor is a layer of insulation material. Preferably, this layer of insulation is relatively thin and most preferably, this thin insulation layer would have a thickness of approximately 0.0005 inch. This insulation is necessary to prevent the likelihood of false indications due to either air-borne contaminants or water ingestion.

The primary reason that this edge insulation be made of a very thin layer is because it must be eroded by the outer race of the auxiliary bearing assembly which is rotating at high speed before the outer race is able to make contact with the conductive rings of the bearing sensor. Once the edge insulation is eroded, the outer race of the rotating auxiliary bearing assembly contacts the conductive rings and a circuit is achieved which reduces the resistance monitored at the control unit. The control unit will then warn the cockpit of imminent main bearing failure. At this point, the auxiliary bearing assembly will continue to rotate and continue to erode the sensor disc as long as the main bearing assembly continues to support the generator shaft. This situation will continue until the main bearing assembly has worn to a point where the outer race of the auxiliary bearing assembly will contact the bearing support wall or, more specifically, the steel liner of the bearing support wall, and begin to take over support for the generator shaft from the main bearing assembly.

The sensor disc has a pair of holes for alignment with female threaded holes located in the base of the bearing wall recess. Once the disc is inserted into the recess, screws are used to secure the sensor disc against the base of the bearing wall recess.

A pair of wires extend away from the side of the sensor that faces away from the bearing wall recess. Each wire lead is connected to a respective conductive layer and provides information on the resistance of the bearing sensor to a control unit. Each wire lead actually passes through its own set of holes, one hole located on each layer. Each set of holes has a common axis of symmetry. The wires are passed through each respective set of holes and then secured on the other side of the sensor by soldering or other attachment means.

In the preferred embodiment, a resistor is also secured on either side to a respective conductive layer of the sensor to provide a means for detecting whether the sensor disc has failed prematurely (i.e. placed in series between each conductive layer).

Also, in the preferred embodiment, a final insulation coating is applied to the sensor except on the sensor inside circumference. This final insulation has a thickness of approximately 1 mil and is termed a conformal coating to profile. The preferred application is to dip the sensor into the coating and then dry by exposure to ultra-violet light. This conformal coating serves to protect the sensor from inadvertent electrical contact with the housing, as well as contamination and moisture.

The recess base may also have a depression so that the solder connecting the wire leads to the sensor does not contact the metallic housing when the sensor is seated properly within the housing recess.

Once imminent failure of the main bearing assembly is detected and the generator is serviced, the bearing sensor can be easily replaced by removing the worn sensor from the housing recess and inserting a new sensor in its place. The wire leads are connected to either a board, wires, or other means for communicating to a control unit.

To summarize, the objectives of my invention include providing a bearing failure sensor which can detect the failure or imminent failure of a main bearing. This type of reliable detection of bearing failure will eliminate the need for TBO maintenance and replace with an "on-condition" maintenance program. The bearing failure sensor is modular, and easy to produce by utilizing printed circuit board technology.

Other features and advantages will become apparent to those skilled in the art upon review of the following detailed description and claims.

BRIEF DESCRIPTION OF THE DRAWINGS

FIG. 4 is an exploded view of the modular bearing sensor.

FIG. 5 is a perspective view of the modular bearing sensor.

DETAILED DESCRIPTION OF THE PREFERRED EMBODIMENT

Figure 1:
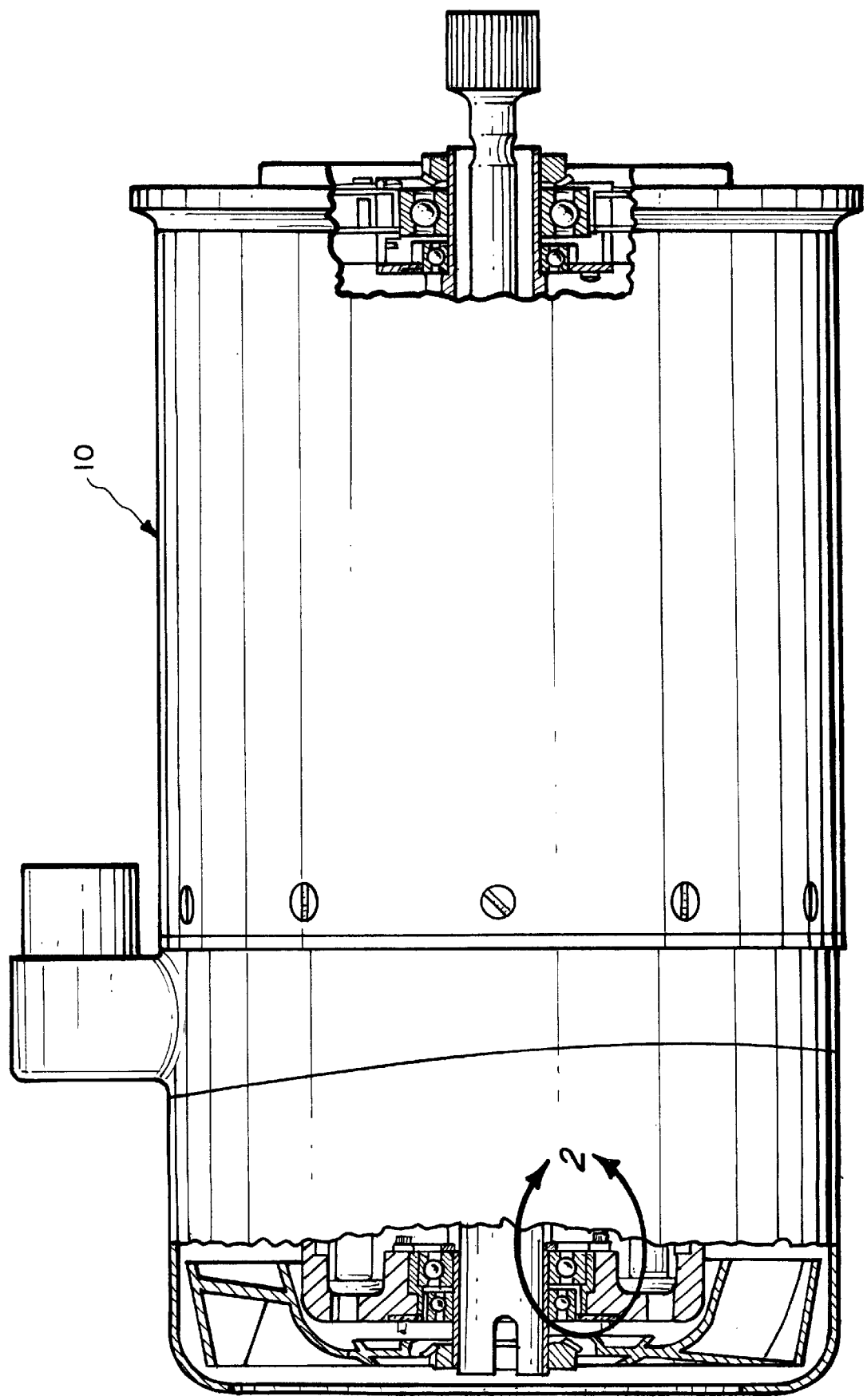
FIG. 1 is a side sectional view of a generator having the modular bearing sensor of the present invention.

FIG. 1 generally illustrates a generator 10 having a shaft 12, a main bearing assembly 14, an auxiliary bearing assembly 16, and my modular bearing sensor 18.

As best viewed in FIG. 4 and FIG. 5, bearing sensor 18 is a laminated printed circuit board shaped in a substantially ring or disc configuration. Sensor 18 has both a close tolerance outer diameter and a close tolerance inner diameter.

Sensor 18 comprises a pair of layers 20 and 22 where layers 20 and 22 have conductive rings 24 and 26 respectively and preferably made of copper or other highly electrically conductive material. Besides conductive rings 24 and 26, layers 20 and 22 comprise an insulation material made of GIL, a high temperature, high strength laminating plastic. Conductive rings 24 and 26 are present on only one facial side of their respective layer as shown in FIG. 4.

A third layer 28 is also made of insulation material but does not possess the conductive rings as layers 20 and 22. The purpose of third layer 28 is to insulate the outer surface of conductive ring 24 which faces away from layer 20. Third layer 28 also has a pair of conductive areas 34 and 36. Layer 22 also has a pair of conductive areas 38 and 39 on the face opposite ring 26 as depicted by hidden lines as shown in FIG. 4. Conductive area 38 and 39 are connected to respective wire leads 40 and 42 by soldering or other type of electrical connecting means.

Conductive rings 24 and 26 have enlarged conductive areas 30 and 32 respectively. The purpose of areas 30 and 32 will now be described. Each of the three layers, 20, 22, and 28 have six holes having a common axis of symmetry with corresponding holes of each layer. Holes 50 and 52 on each layer are provided for insertion of screws 56 to hold the disc within housing recess 54 as will be discussed later.

A pair of lead wires 40 and 42 are connected to sensor 18 by passing each wire through a separate hole in each of the three layers 28, 20, and 22. The purpose of leads 40 and 42 is to communicate resistance information to a control unit (not shown). Sensor 18 is shown in FIG. 5 fully assembled. However, the exploded view of FIG. 4 illustrates the internal configuration of sensor 18 necessary for providing resistance information to a control unit.

A resistor 44, has a first end 46 and a second end 48.

Wire lead 40 and first end 46 are conductively connected at conductive area 34 and also at conductive area 32. Both wire lead 40 and first end 46 pass through separate holes in the insulation material of layer 20 but do not contact conductive ring 24.

Wire lead 42, and second end 48 are conductively connected at conductive area 36 and also at conductive area 30. Both wire lead 42 and second end 48 pass through separate holes in the insulation material of layer 22 but do not contact conductive ring 26.

Layers 20 and 22, having conductive rings 24 and 26 respectively, and layer 28 are laminated and wire leads 40 and 42 and resistor 44 are thereafter attached using well-known printed circuit board technology which will not be discussed here in detail.

Figure 2:
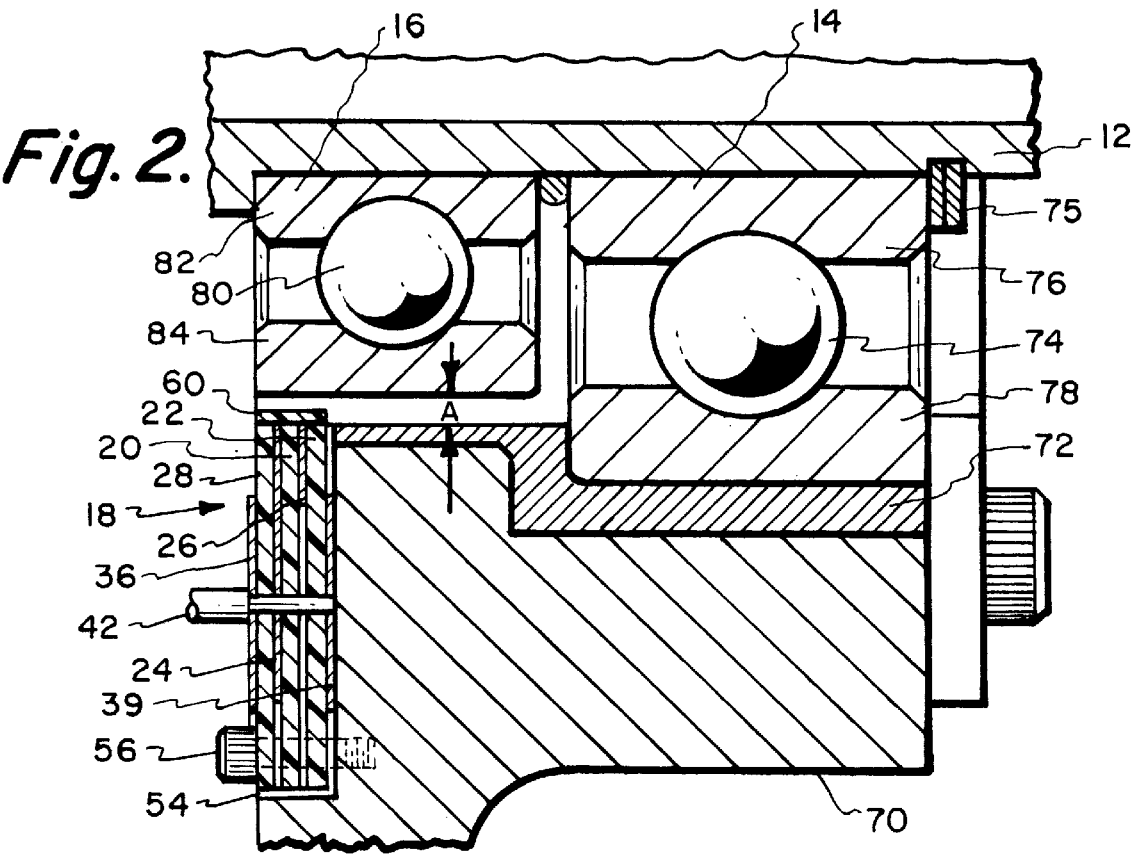
FIG. 2 is a scale-less close-up view of the sensor in relation to the bearing assemblies and generator shaft.

Sensor 18 thereafter has a thin layer of GIL insulation coating 60 on the inner circumferential area 58 as shown in FIG. 2. This area is defined as the area of layers 20, 22, and 28 including conductive rings 24 and 26 which border aperture 62. This coating is very thin and is approximately 0.0005 inch.

Finally, a conformal insulation coating of approximately 0.001 inch (not shown) is applied to sensor 18, wire leads 40 and 42, and resistor 44 to protect sensor 18 from moisture and airborne contaminants. It is important to note that the conformal coating is not applied to inner circumferential area 58.

Sensor 18, thus described, is inserted into a housing recess 54 which is about shaft 12. The recess can be of any depth or outer configuration so long as the inner circumference of conductive rings 24 and 26 of sensor 18, when seated within recess 54, are facing auxiliary bearing assembly 16. Screws 50 are then used to secure sensor 18 to the base of recess 54.

Once assembled, generator 10 can be operated and the initial positioning of the bearing sensor 18 relative to auxiliary bearing assembly 16 is shown in FIG. 2.

Main bearing assembly 14 has a set of bearings 74 disposed between an inner race 76 and an outer race 78 and is held in position by circular retainer clip 75 seated in a shaft groove. Outer race 78 is in frictional contact with the steel liner 72 of aluminum housing 70. Auxiliary bearing assembly 16 has a set of bearings 80 disposed between an inner race 82 and an outer race 84. As the generator is operated, shaft 12 rotates and is supported by main bearing assembly 14. In this situation, outer race 84 of auxiliary bearing assembly 16 is not in frictional contact with steel liner 72 and is free to rotate in the same direction of rotation as shaft 12.

As shown in FIG. 2, there is a space between outer race 84 and steel liner 72 which defines annular clearance "A". Inner circumferential area 58 and insulation layer 60 extend into annular clearance "A". Therefore, conductive rings 24 and 26 are partially within annular clearance "A".

As generator 10 continues to operate, bearings 74 will wear reducing the distance between outer race 78 and inner race 76. As this occurs, annular clearance "A" decreases.

Figure 3:
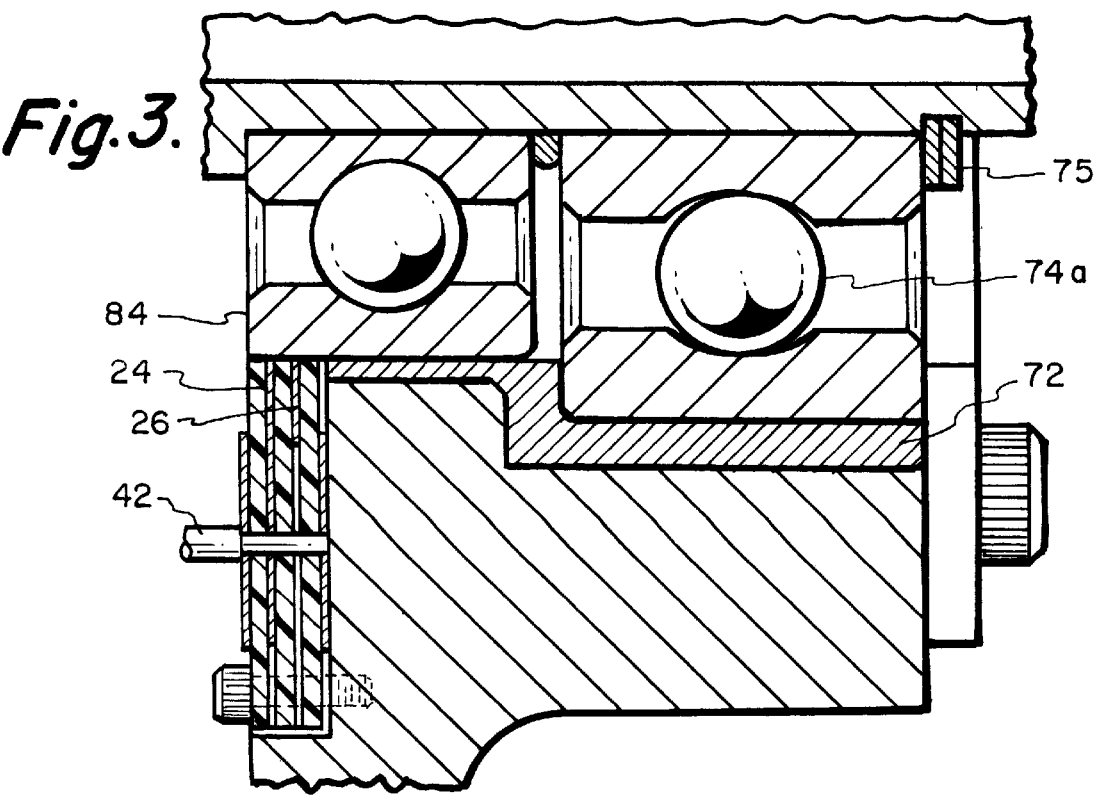
FIG. 3 is a scale-less close-up view of the sensor in relation to the bearing assemblies and generator shaft indicating main bearing assembly failure.

At some point in time, annular clearance "A" will decrease to the point where outer race 84 will contact insulation layer 60. Since outer race 84 is rotating with shaft 12, it will begin to erode insulation layer 60. When insulation layer 60 has been eroded, auxiliary bearing assembly 16 will make contact with the conductive rings 24 and 26 of bearing sensor 18. A circuit is thus established which reduces the resistance of bearing sensor 18 monitored at the control unit. The control unit will then warn the cockpit of imminent main bearing failure. At this point, the auxiliary bearing assembly 16 will continue to rotate and continue to erode sensor disc 18 as long as there remains an annular clearance. This situation will continue until the main bearings 74a have worn to a point where the auxiliary bearing outer race 84 contacts steel liner 72 and auxiliary bearing assembly 16 takes over support for the generator shaft 12 from main bearing assembly 14 as shown in FIG. 3.

Figure 6A:
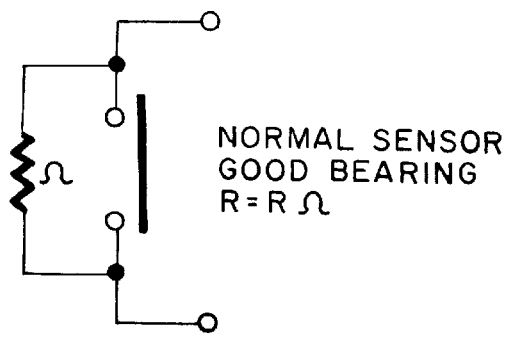
FIG. 6a indicates resistance of a functioning main bearing assembly and functioning sensor.
Figure 6B:
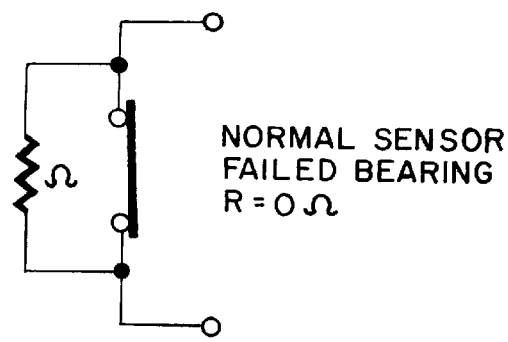
FIG. 6b indicates resistance of a failed main bearing assembly.
Figure 6C:
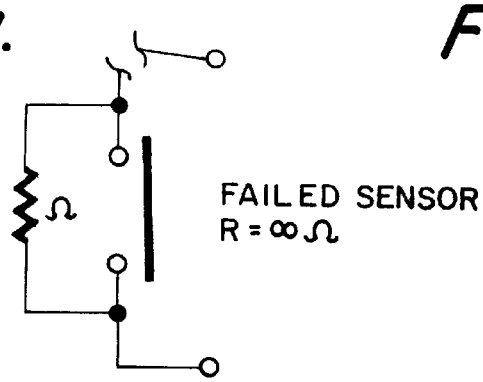
FIG. 6c indicates resistance of a failed sensor.
Figure 7:
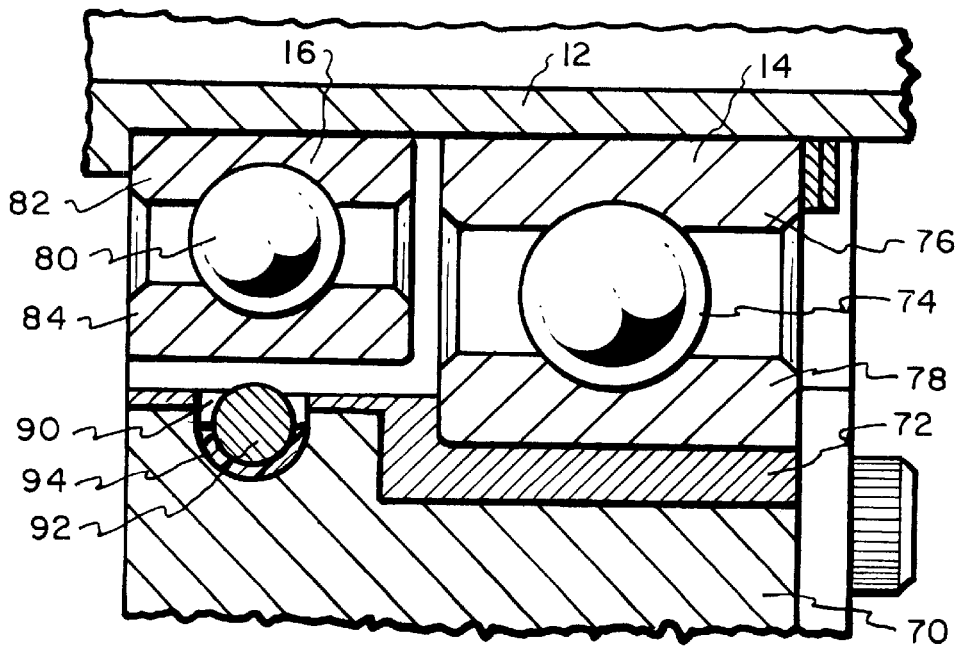
FIG. 7 is a close-up view of a prior art bearing failure sensor in relation to the bearing assemblies and generator shaft.

FIG. 6a, FIG. 6b, and FIG. 6c illustrate the different situations which can be monitored by a control unit connected to leads 40 and 42.

Where main bearing assembly 14 has not failed, auxiliary bearing assembly 16 will not contact conductive rings 24 and 26 and a control unit will monitor the resistance of resistor 44. If resistor 44 or sensor 18 fails or malfunctions, the control unit will read infinite resistance since there is no path for current to flow between wire leads 40 and 42. If outer race 84 of auxiliary bearing assembly 16 erodes insulation layer 60 and contacts rings 24 and 26, a circuit is established bypassing resistor 44 so that the control unit will monitor a change in resistance which will approach zero resistance.

I claim:

1. An electrical generator which comprises:
a housing assembly;
a stator assembly fixedly mounted with respect to the housing assembly;
a main bearing assembly supported by the housing assembly;
a shaft supported for rotation in the bearing assembly and extending through the housing assembly;
a rotor assembly mounted on the shaft for rotation therewith inside the stator assembly;
an auxiliary bearing assembly mounted on the shaft;
a modular bearing failure sensor comprising a laminated printed circuit board having a substantially ring-shape configuration having an outside circumference and an inside circumference;
a recess located in said housing assembly for receiving said modular bearing failure sensor, said recess further positioned so that the inside circumference of said sensor will be positioned about but not in contact with said auxiliary bearing assembly; and,
means for communicating resistance information from said sensor to a distal control unit when said sensor is in conductive contact with said auxiliary bearing assembly.

2. An electrical generator which comprises:
a housing assembly having a substantially cylindrical aperture;
a stator assembly fixedly mounted with respect to the housing assembly;
a main bearing assembly supported by the housing assembly, the main bearing assembly comprising an inner race, an outer race and a plurality of main bearings disposed between said races;
a shaft supported for rotation in the bearing assembly and extending through the cylindrical aperture of the housing assembly;
a rotor assembly mounted on the shaft for rotation therewith inside the stator assembly;
an auxiliary bearing assembly mounted on the shaft having auxiliary bearings disposed between an inner race and an outer race, the space existing between the outer race and the housing assembly defining a clearance;
a modular bearing failure sensor comprising a laminated printed circuit board having a substantially ring-shape configuration having an outer circumference and an inner circumferential area;
a recess located in said housing assembly for receiving said modular bearing failure sensor, said recess further aligned so when said sensor is seated within said recess, the inner circumferential area of said sensor will be positioned about said auxiliary bearing assembly and the inner circumferential area of said sensor will extend partially into said clearance.

3. The electrical generator of claim 2 where said modular bearing failure sensor further comprises a thin layer of insulation on said inner circumferential area.

4. A modular bearing failure sensor for positioning around an auxiliary bearing assembly mounted on a generator shaft comprising:
a printed circuit board having a substantially ring-shaped configuration with an outer circumference and an inner circumference;
said printed circuit board further having a pair of ring-shaped conductive elements adjacent to said inner circumference; said conductive elements separated from each other by a layer of insulation material; and
means for indicating to a control unit when the auxiliary bearing assembly is in contact with the conductive elements of said printed circuit board.

5. The modular bearing failure sensor of claim 4 where said indicating means is a pair of electrical leads each connected to a respective ring-shaped conductive element of said printed circuit board so that the control unit will monitor a change in resistance when the auxiliary bearing assembly is in contact with the conductive elements of said printed circuit board.

6. A modular bearing sensor comprising:
   a printed circuit board having an inner circumferential area and an outer circumferential area, the space within the inner circumference defining an aperture, said board comprising:
   a. a first layer of insulation material having a ring of conductive material deposited on one facial side, said conductive ring being adjacent to the inner circumference but having a smaller outer circumference than the first layer;
   b. a second layer of insulation material laminated to said first ring layer such that the conductive ring of said first layer is disposed between said first and second insulation layers, said second layer further having a ring of conductive material deposited on one facial side, said conductive ring being adjacent to the inner circumference but having a smaller outer circumference than the second layer;
   c. a third layer of insulation material laminated to said second ring layer such that the conductive ring of said second ring layer is disposed between said second and third insulation layers;
   d. a thin layer of insulation material disposed upon said inner circumferential area of said first, second and third layers; and,
   means for electrically connecting said conductive rings to a control unit to monitor the electrical resistance of the sensor.

7. The modular bearing failure sensor of claim 6 where said electrically connecting means comprises:
   a first lead connected to the first electrically conductive ring and a second lead connected to the second electrically conductive ring for connecting each ring to a control circuit to determine if the conductive layers have contacted the auxiliary bearing assembly through changes in the electrical resistance of the sensor.

8. The modular bearing sensor of claim 7 where the first, second, and third insulation layers and the rings of conductive material have a common axis of symmetry to said aperture.

9. The modular bearing sensor of claim 7 further comprising a resistor connected in series between said wire leads.

10. The modular bearing sensor of claim 9 further comprising a conforming insulation coating deposited upon said resistor, said wire leads and said bearing sensor except that the conforming insulation coating is not deposited upon said inner circumferential area.

11. The modular bearing sensor of claim 6 where the first, second, and third insulation layers and the rings of conductive material have a common axis of symmetry to said aperture.

12. The modular bearing sensor of claim 6 further comprising a resistor connected in series between said wire leads.

13. A method for detecting the imminent failure of a main bearing in an electrical generator which comprises a housing, a shaft, at least one main bearing assembly which supports the shaft within the housing, a stator assembly mounted within the housing, and an auxiliary bearing assembly for each main bearing assembly and mounted on the shaft, the space between the auxiliary bearing assembly and the housing defining a annular clearance, the method comprising the steps of:
   providing a recess in the generator housing which is about the auxiliary bearing assembly;
   providing a bearing sensor having an aperture where the edge of the sensor about said aperture defines an inner circumference;
   connecting said sensor to a control unit;
   inserting said sensor into said recess;
   securing said sensor to the base of said recess so that the inner circumference of said sensor extends partially into said annular clearance; and,
   operating said generator so that the main bearing assembly will wear, causing the auxiliary bearing assembly to eventually contact the inner circumference of said sensor and establish an electrical circuit with the sensor which will be monitored by the control unit as a drop in resistance before the auxiliary bearing assembly takes over support of the shaft from the main bearing assembly.

* * * * *